United States Patent

[11] 3,580,064

| [72] | Inventors | Ari Bar-on<br>Cherry Hill, N.J.;<br>Norman M. Emslie, Yardley, Pa. |
|---|---|---|
| [21] | Appl. No. | 811,138 |
| [22] | Filed | Mar. 27, 1969 |
| [45] | Patented | May 25, 1971 |
| [73] | Assignee | Philco-Ford Corporation<br>Philadelphia, Pa. |

[54] RADIAL RUNOUT RECORDER
4 Claims, 4 Drawing Figs.

[52] U.S. Cl............................................. 73/146
[51] Int. Cl............................................. G01m 17/02
[50] Field of Search................................. 73/146;
33/203, 203.11

[56] References Cited
UNITED STATES PATENTS

| 1,678,363 | 7/1928 | Smithers.................. | 73/146 |
| 2,695,520 | 11/1954 | Karsai..................... | 73/146 |
| 2,914,940 | 12/1959 | Elliott et al................ | 73/146 |
| 2,920,481 | 1/1960 | Hulswit, Jr. et al.......... | 73/146 |
| 3,060,733 | 10/1962 | Herzegh................... | 73/146 |
| 3,375,714 | 4/1968 | Bottasso................... | 73/146 |

Primary Examiner—Louis R. Prince
Assistant Examiner—Joseph W. Roskos
Attorney—Carl H. Synnestvedt ABSTRACT: Apparatus for recording "radial runout" of a loaded automobile wheel and tire combination. Linkage is provided to measure the radial runout while the wheel is under normal load, and includes a device—such as an elongate indicator-pen arm—to multiply the measurement. The multiplied value is recorded on a chart secured to the wheel and concentric therewith.

PATENTED MAY 25 1971
3,580,064
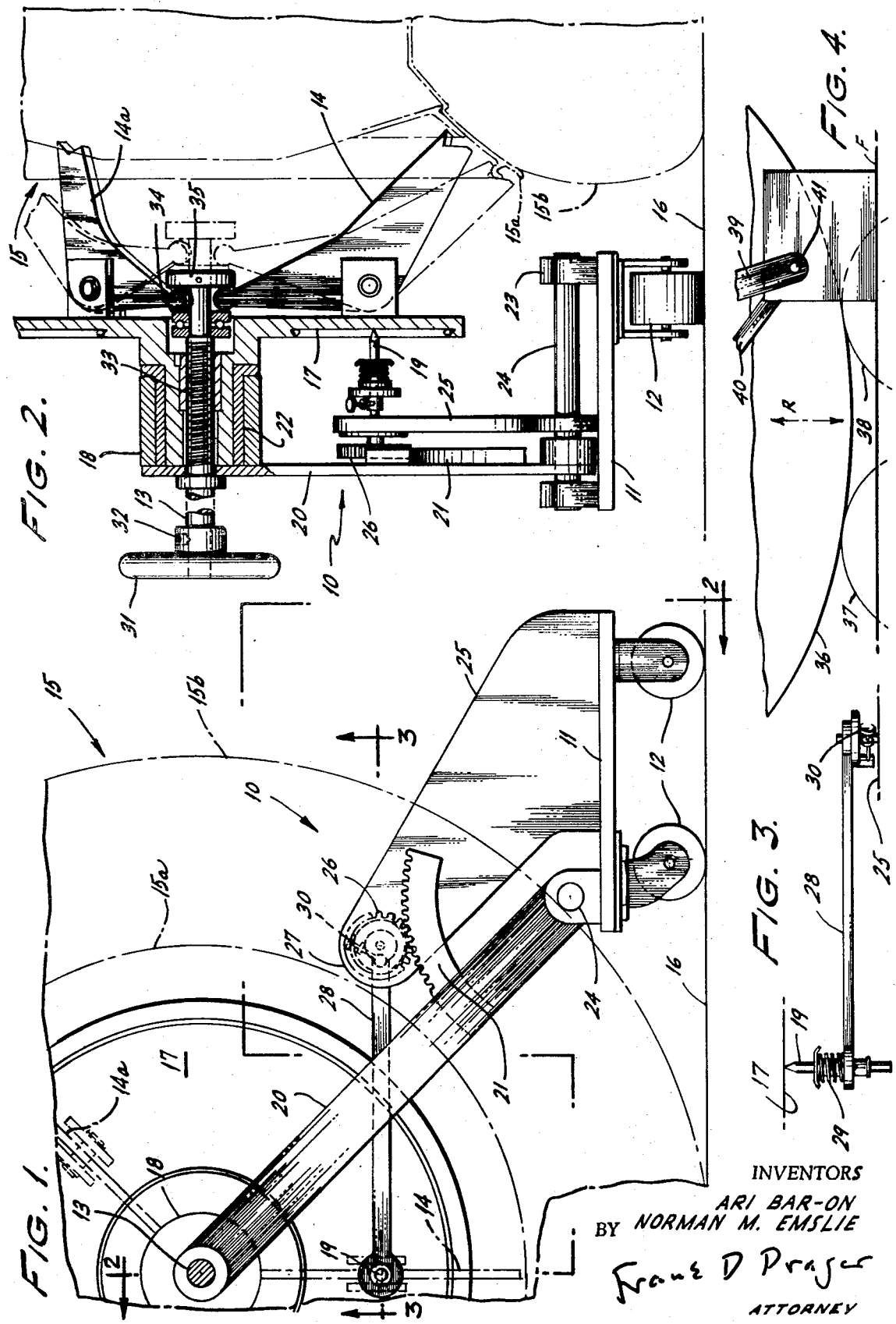
INVENTORS
ARI BAR-ON
NORMAN M. EMSLIE
BY Franz D. Prager
ATTORNEY

RADIAL RUNOUT RECORDER

BACKGROUND OF THE INVENTION

Heretofore it was difficult, in diagnostic and evaluation operations applied to automobile wheels and tires, to record radial runout or eccentricity with accuracy and simplicity. Conventional, simple radial runout recorders measure only unloaded eccentricity, as they merely test a wheel freely mounted on a separate spindle and not under normal load. However, a wheel/tire combination may be perfectly round in an unloaded condition, ad yet faults in the tire may render it markedly eccentric or irregular when mounted on an automobile and thereby exposed to load.

SUMMARY OF THE INVENTION

The new apparatus measures and records the eccentricity of a wheel/tire combination under normal load conditions, whereby it provides information of greater diagnostic value than the simple conventional runout recorders are able to obtain. In a preferred embodiment of the invention, this has been achieved by recording apparatus (advantageously mounted on a dolly which trails the wheel to be tested), which comprises an elongate recording pen arm to measure and multiply the radial runout encountered when the wheel operates under load. Readings are recorded by convenient means, for example on a chart mounted concentrically of the axle of the wheel/tire combination to be tested. It is a feature of this embodiment that the runout measuring and multiplying pen arm is actuated by a pinion the radius of which is of much shorter length than that of its actuating gear, and also much shorter than the pen arm, in order to obtain the desired multiplication.

BRIEF DESCRIPTION OF THE DRAWING

FIG. 1 shows the preferred embodiment, in side view.

FIG. 2 is a rear end view, partly in vertical section and taken along line 2—2 in FIG. 1.

FIG. 3 is a sectional view of a detail, taken along line 3—3 in FIG. 1.

FIG. 4 is a diagrammatic view showing a modified wheel and tire support system.

DESCRIPTION OF THE PREFERRED EMBODIMENT

As shown in FIG. 1, recording apparatus 10 is mounted on dolly 11, which runs on wheels 12 and is attached to a car by extension shaft 13 having a system of spider arms 14, 14a. Two arms are shown in FIG. 2, each in two positions thereof. These arms of the spider unit, operating in unison, engage rim 15a of the hub of automobile wheel 15. The wheel remains attached to the car (not shown) rotating about an axis which is concentric with shaft 13. Tire 15b of the wheel, as well as dolly 11, is shown as running on a smooth surface or ground 16.

As additionally shown in FIG. 2, recording apparatus 10 cooperates with a chart surface 17 concentrically secured to extension shaft 13 by hub structure 18. A chart-contacting pen 19, carried by linkage on dolly 11, scribes a curve (not shown) as chart 17 rotates with wheel 15. When radial runout of the wheel is encountered, the vertical distance between extension shaft 13 and ground 16 changes, while the level of operation of dolly 11 remains the same, and this change of vertical distance between shaft 13 and ground 16 reflects not only geometrical irregularities of wheel 15, visible in its unloaded condition, but also other irregularities, such as structural deformities of the tire 15b, which are measurable only in loaded condition of the wheel.

Pen 19 is controlled by linkage mounted on dolly 11 and which, as shown, includes a trailing arm 20 connecting the dolly to shaft 13 and thence to the car. This arm has a sector gear 21 rigidly attached thereto between shaft 13 and dolly 11. The arm is shown as pivoted on hub 18 by a bearing 22, and is also pivoted, by bearings 23, about a horizontal shaft or pin 24 on dolly 11. A second arm 25 is rigidly attached to dolly 11 and extends upwardly forwardly therefrom (FIG. 1) toward shaft 13, along trailing arm 20. This second and rigidly mounted arm 25 has a pinion 26 journaled to its upper and forward end 27.

According to the invention, the pinion is meshed with sector gear 21 of trailing arm 20, and has much shorter radius than this sector gear, and the aforementioned recording pen 19 is fixed to a lever 28, secured to pinion 26 and substantially longer than its radius. It will be seen that the gear sector and pinion convert vertical motion of shaft 13, toward or away from ground 16, into rotary motion of lever 28, and multiply the motion, whereby the linkage facilitates recording of the runout by pen 19 on chart 17.

Pen 19 is kept in contact with this chart by spring means 29, shown in FIG. 3, to record the multiplied runout measurement. For calibration of the pen relative to the chart, adjustment means 30 may be provided, as will be understood without detailed description.

In operation, car wheel 15 rolls along ground 16, pulling dolly 11. It will be appreciated that the ground, or reference table, 16 should be as smooth and level as possible. Pen 19 initially contacts chart 17 at some point of a circle concentric with the chart and wheel. Whenever any eccentricity or runout is encountered the recording apparatus records it on the chart by deflecting the pen from such circle, while keeping it in contact with the chart. For example when the vertical distance from shaft 13 to ground 16 is decreased this causes counterclockwise rotation of trailing arm 20 about lower bearing 24, thereby causing counterclockwise rotation of sector 21 relative to rigid arm 25, and corresponding clockwise rotation of pinion 26 by means of this sector. The rotation of the pinion is multiplied by lever 28 and the multiplied rotation is recorded by pen 19, so that the pen in this case makes an upward excursion on chart 17.

Even a small radial runout of the wheel, under load, may be shown by a substantial and readily noticeable excursion of pen 19, as the radius of sector gear 21, or lever arm 28, or both, can be made much longer than the radius of pinion 26. The mass of the arm can be kept small in order to avoid distortion of the record by inertia of the arm. As a result of the new measuring and multiplying arrangement the apparatus can show loaded radial runout with great clarity, by linkage of extremely simple construction which is easy to build and equally easy to maintain in proper operative condition.

The recording apparatus is readily attached to the wheel and detached therefrom, by operation of a simple handwheel 31 (FIG. 2), secured to spider shaft 13 by a setscrew 32 or the like, and which operates spider links 14 by a screw and nut unit 33 having abutment collars 34, 35, as will be obvious from the drawing. Together with this unit and hub 18, trailing arm 20, dolly 11 and recording apparatus 10 are attached to the wheel, and detached therefrom when the desired record has been taken.

MODIFIED EMBODIMENT

In FIG. 4 we illustrate, somewhat diagrammatically a modified arrangement for supporting a wheel and tire 36. In this embodiment the wheel/tire combination is supported upon a drive roller system which may be similar to apparatus used in dynamometers, rather than being supported upon a level ground or reference surface as is the case with the embodiment described above. In either case, however, the wheel is supported by structure with respect to which said wheel is rotated. A pair of rollers 37 and 38 are recessed within floor structure F and one roller may be driven by known means, to cause rotation of the wheel under inspection. In one very simple form, such apparatus may include the double-arm structure shown at 39—40. The arms are rigidly linked and pivotable about an axis 41. In practice arm 39 is extended into connection with the axle (not shown) which supports the wheel under inspection, and arm 40 carries a stylus at its free end for recording runout on a record surface (not shown) which may, for example, be a chart as described above. In such an arrangement the motion imparted to the stylus by vertical excursions of the axle will be proportional to the ratio of lengths of the two arms 39 and 40. If desired, additional motion-multiplying linkage may be applied in the vicinity of pivot 41. If the spacing between drive rollers 37, 38 is maintained at a sufficiently small value, as compared with the diameter of the wheel/tire under test, it is possible in such a system to record runout excursions R along a vertical line with accuracy closely approaching that achieved where the tire rolls along a plane floor surface.

We claim:

1. In combination with an automobile wheel/tire assembly, apparatus for recording the radial runout of said assembly when subjected to normal load conditions imposed by the supported automobile, said assembly and its load being carried by support structure comprising a flat ground-supported surface which underlies the same and with respect to which the assembly may be rotated, said apparatus comprising: means associated with the center of such assembly and responsive to variations in distance between said center and the underlying support structure to produce, at a remote point, movements corresponding to such variations; and means for recording the latter movements.

2. Apparatus for recording radial runout of a wheel, running under load on support means, comprising: a dolly; linkage connected to the center of the wheel and to the dolly to pull the dolly along with the wheel during rotation of the latter on said support means; means mounted on the dolly for measuring variations of vertical distance between the center of the wheel and the support means; means for multiplying the measurements; and means for recording the multiplied measurement.

3. Apparatus as described in claim 2, including a link having structure at one end thereof pivoting it to the center of the wheel, and having structure at the opposite end pivoting it to said dolly, to effect trailing of the dolly.

4. Apparatus as described in claim 2 including a gear segment secured to said link and a pinion pivoted to structure on said dolly, said pinion being part of the measuring means mounted on said dolly.